United States Patent Office 2,931,705
Patented Apr. 5, 1960

2,931,705

PROCESS FOR PREPARING ZIRCONIUM CHLORIDES

Peter R. Girardot, Akron, Ohio, assignor to Columbia-Southern Chemical Corporation, Allegheny County, Pa., a corporation of Delaware No Drawing. Application September 18, 1957
Serial No. 684,657

4 Claims. (Cl. 23—87)

The present invention relates to the manufacture of zirconium chlorides and is more particularly directed to the chlorination of zirconium bearing ore to provide zirconium tetrachloride.

The chlorination of zirconium containing materials, especially zirconium bearing ores such as zircon and zirkite, to obtain zirconium tetrachloride, is one step in the manufacture of zirconium metal. It is by such a process that zirconium is obtained either from its natural state as an ore or from refined ores in a form which may be converted, as by reduction, to its metallic state.

Chlorination to zirconium tetrachloride of the zirconium contents of zirconium bearing materials requires rigorous reaction conditions. Elevated temperatures on the order of 1000° C. usually are regarded as necessary, for example, in the chlorination of zircon sand. At these temperatures, the corrosion problems and the selection of appropriate materials of construction for the chlorinator impose practical limitations upon commercial operation of the chlorination.

According to this invention, zirconium bearing materials, especially zircon sands and other zirconium silicate type ores, are chlorinated efficiently and easily to zirconium chlorides and notably zirconium tetrachloride at moderated reaction conditions including less severe temperatures. These benefits and particularly the minimization of reaction temperatures are realized by chlorinating the zirconium bearing material in the presence of a boron oxide, notably boric oxide. Thus, by admixing a small amount of a boron oxide in the zirconium bearing material, chlorination with elemental chlorine or other chlorinating agent of the zirconium to zirconium tetrachloride proceeds at temperatures substantially below those required without the boron oxide. Chlorination temperatures are hereby made possible which are 50° C. to 200° C. cooler than are otherwise useful.

In performing this invention, a mixture of zirconium bearing material and carbon in finely divided state containing between 0.2 and 5 percent boric oxide by weight of the mixture is contacted with elemental chlorine or other chlorinating agents at the chlorinating temperatures usually between 600 and 900° C. to yield zirconium tetrachloride. Besides boric oxide, other inorganic boron compounds including sodium borate, borosilicates, and other boron oxides or boron oxide type compounds which under the conditions of chlorination yield a boron oxide are useful. Thus, included are the various known sub-oxides of boron as well as sesquioxide form. The concentration in which the boron oxide is present is usually small, e.g. 0.2 to 5.0 percent or even 10 percent by weight of the zirconium material and carbon, although larger boron oxide concentrations may be used. While temperature reductions are possible using concentrations below 0.1 percent boron oxide by weight, minimization in temperature is more pronounced at higher concentrations, e.g., 0.2 percent.

Zirconium bearing materials susceptible of chlorination are in general useful. Most prominent of the zirconium bearing materials used in accomplishing this invention are the zirconium bearing ores such as the zircon sands which are primarily zirconium silicates, either a physical combination of zirconium oxide and silicon oxide (e.g., $SiO_2$) or in chemical combination. Such ores contain minor concentrations of other metals, usually as their oxides, such as titanium, iron and aluminum. Other zirconium bearing ores are capable of chlorination in the manner of the present invention including zirkite.

Prior to chlorination, these zirconium bearing materials should be as a finely divided particulate material. If necessary, the desired state of subdivision may be obtained by ball milling or other mechanical expedient. The chlorination proceeds with greatest facility when the zirconium bearing ore is in the form of finely divided particles, usually between 3 and 300 mesh.

In this finely divided form, the zirconium bearing material, notably zircon sand, is mixed with finely divided carbon. The finely divided carbon is in the same general state of subdivision as is the ore. At least sufficient carbon is included to account for all the oxygen theoretically liberated by the chlorination as carbon monoxide or carbon dioxide.

This mixture of finely divided zirconium bearing material and elemental carbon including the minor concentration of boron oxide is contacted with elemental chlorine or other chlorinating agent such as carbon tetrachloride or mixtures of such agents in a suitable reactor. Temperatures of from 600° C. to 900° C., or sometimes somewhat higher, are used.

The reactor may be in one of the many various forms. Most prominently, the reactor is comprised of an elongated tubular structure in which the mixture including the zirconium bearing material is placed. Sufficient quantities are employed to provide a chlorination bed having a depth of at least 2 inches and more preferably from 1 to 6 feet. The chlorinating agent, notably elemental chlorine, is fed to the chlorinator, and passed through the bed of zirconium bearing ore maintained at chlorination temperature. Zirconium tetrachloride vapors are evolved and recovered.

The use of a vertically disposed cylindrical reactor is well suited to this operation. Chlorine gas is charged into the bottom of the reactor, usually below or into the lower portion of the bed of zirconium material passing upwardly through the bed. Good distribution of the chlorine throughout the cross-section of the bed perpendicular to the upward flow of the chlorine is advisable. In this manner, the chlorine gas rises up into the bed of chlorinatable material.

The zirconium tetrachloride generated in the bed rises upwardly and out of the bed and may be recovered as solid zirconium tetrachloride by simple condensation of the gases.

Carbon is included in the chlorination bed for several purposes. It facilitates the chlorination and may function as a reducing agent by chemical combination with the oxygen of the zirconium bearing component of the ore. At least, carbon monoxide and/or carbon dioxide are found in the vapors emanating from the reactor. If necessary and desirable, oxygen may also be fed to the reaction bed and burnt with the carbon to evolve heat as a means for generating and maintaining the bed at chlorination temperatures.

It will be understood that proper temperature control of the reaction bed depending upon its size, the rate of chlorination and other factors may either involve adding or removing heat from the bed in order to sustain it at the specific desired temperature range. It has already been indicated that heat may be added to the bed by the burning of carbon.

The chlorination bed through which chlorine is passed upwardly may take several forms. It may simply be a static bed, a moving bed, an extended bed, or it may be in fluidized condition. That is, the velocity of the chlorinating gas, diluted if necessary with inert gases such as nitrogen, may be passed into the lower portion of the bed and upwardly therethrough at a rate such that the bed may give the appearance of a boiling liquid. In this fluidized condition, the particles comprising the bed are in motion relative to one another. Fluidized beds of this character are particularly efficient chlorinating systems.

The following example illustrates the manner in which the present invention may be practiced:

Example

A vertically disposed reaction tube of a one inch internal diameter was charged with 62 grams of a mixture comprising 76 percent by weight zircon sand and 24 percent by weight lamp black to which have been added 2 percent (1.24 grams) boric oxide. The bed height was twelve inches. The zircon sand was finely divided (3 to 5 mesh) and analyzed chemically as follows:

|  | Percent by weight |
|---|---|
| $ZrO_2$ | 67.4 |
| $SiO_2$ | 31.5 |
| $HfO_2$ | 0.89 |
| $FeO_2$ | 0.28 |
| $MgO$ | 0.6 |

Very small quantities of other metals including copper, nickel and manganese probably as their oxides were also present.

Feeding 0.1 liter per minute (at standard temperature and pressure) of dry nitrogen upwardly through the bed, the tube and its contents were heated to 789° C. Thereafter, the nitrogen flow was halted and 0.1 liter per minute of chlorine was passed upwardly through the bed. The evolved zirconium tetrachloride was collected as a solid and the balance of the gases vented. Samples of these vent gases were analyzed.

Thereafter, the temperature was first decreased to 732° C., then to 684° C. and finally to 678° C. while maintaining the chlorine flow rate constant. An exit gas sample was obtained at each of the above temperatures, analyzing as follows:

ANALYSIS OF VENT GAS SAMPLE (CHLORINE FREE BASIS)

| Temperature of Chlorination when Sample Taken, °C. | Percent by weight | | | | | | | |
|---|---|---|---|---|---|---|---|---|
| | $SiCl_4$ | $COCl_2$ | $CO_2$ | $HCl$ | $O_2$ | $CO$ | $N_2$ | Free $Cl_2$ |
| 789 | 2.3 | | 2.4 | 10.4 | 7.2 | 31.7 | 45.4 | 0 |
| 732 | 8.6 | | 5.9 | 14.2 | 4.2 | 31.3 | 27.7 | 0 |
| 684 | 12.2 | 8.3 | 13.9 | 14.2 | 0.1 | 34.9 | 16.3 | 2.2 |
| 678 | 11.8 | 27.7 | 23.0 | 10.3 | 0.1 | | 27.0 | 12.2 |

During the chlorination which was conducted for 175 minutes, 15.1 grams of a mixture of zircon sand and lampblack containing boron oxide in the ratio of the initial charge as above detailed was added to the bed.

The bed residue at the end of the chlorination contained 0.16 percent boric oxide by weight. The zirconium tetrachloride produced in this manner was condensed from the exit gases. The analysis of the four respective exit gas samples indicated that silicon tetrachloride was also produced. At the operating temperatures of 732° C. and 789° C., the exit gases contained no free chlorine. With the chlorination temperature at 684° C., the exit gases contained 2.2 percent free chlorine while at 678° C., they contained 12.2 percent free chlorine.

The ratio of chlorination of the zirconium ($ZrO_2$) to the chlorination of silicon dioxide ($SiO_2$) in the zircon sand was as follows:

| Temperature of Chlorination, ° C. | Ratio of $ZrO_2$ to $SiO_2$ Chlorination |
|---|---|
| 739 | 5.17 |
| 732 | 1.66 |
| 684 | 1.63 |
| 678 | 1.56 |

As the data indicate, chlorination in this process is preferential with regard to the zirconium rather than the $SiO_2$ content of the sand.

The following table lists the chlorination conditions represented by the respective four temperature levels and provides the corresponding temperatures required to obtain in the same system the equivalent chlorine utilization when a boric oxide is not included in the ore:

| Temperature with $B_2O_3$ Present, ° C. | Chlorine Utilization (percent) | Temperature Without $B_2O_3$, ° C. |
|---|---|---|
| 789 | 100 | |
| 732 | 100 | 848 |
| 684 | 90.7 | 812 |
| 678 | 57.5 | 738 |

As can be seen from the foregoing table, the chlorination of zirconium bearing ores to obtain a chlorine utilization equivalent to that achieved when boric oxide is not included in the chlorination bed is accomplished at substantially lower temperatures. These temperature differences range from 60 to about 130° C. Even greater temperature differentials are possible by more careful control of the boric oxide content of the chlorination bed. In this example, the boric oxide contents of the bed diminish during the chlorination until at the conclusion of the chlorination the bed contained but 0.16 percent by weight boric oxide whereas originally the bed contained 2.0 weight percent boric oxide.

While the invention has been described by reference to certain details of specific embodiments, it will be understood that it is not intended that the invention be construed as limited to such details except insofar as they are included in the appended claims.

I claim:

1. The method of chlorinating a zirconium oxide-silicon oxide material to evolve zirconium tetrachloride which comprises passing elemental chlorine into a mixture of said material and carbon, including in said mixture at least 0.1 percent of boron oxide by weight of the mixture and conducting such chlorination at a temperature substantially below that required to evolve a zirconium tetrachloride in the absence of a boron compound and obtain equivalent chlorine utilization.

2. The method of claim 1 wherein the boron compound is boric oxide.

3. The method of chlorinating a mixture of carbon and a zirconium oxide-silicon oxide material to evolve zirconium tetrachloride which comprises passing elemental chlorine into said mixture, including in said mixture from 0.2 to 10 percent boric oxide by weight of the mixture and conducting the chlorination to evolve zirconium tetrachloride at a temperature substantially below that required to evolve zirconium tetrachloride at equivalent chlorine utilization in the absence of the boron compound.

4. The method of claim 1 wherein the concentration of boron oxide is 0.1 to 10 percent by weight of the mixture and the temperature is 600° C. to 900° C.

References Cited in the file of this patent

Mellor's "Comprehensive Treatise on Inorganic and Theoretical Chemistry," vol. 7, p. 143 (1927), by Longmans, Green and Co., New York, N.Y.

Comptes Rendu de l'Academie des Sciences, tome 75, p. 1820 (1872), by Gauthiers-Villars; Paris, France.

UNITED STATES PATENT OFFICE
CERTIFICATION OF CORRECTION

Patent No. 2,931,705                                                   April 5, 1960

Peter R. Girardot

It is hereby certified that error appears in the above numbered patent requiring correction and that the said Letters Patent should read as corrected below.

Column 4, first table, in the heading to the second column thereof, for "Battle" read -- Ratio --.

Signed and sealed this 25th day of April 1961.

(SEAL)
Attest:

ERNEST W. SWIDER
Attesting Officer

DAVID L. LADD
                                                        Commissioner of Patents